United States Patent [19]
Kirchhoff et al.

[11] Patent Number: 4,712,744
[45] Date of Patent: Dec. 15, 1987

[54] APPARATUS FOR CHARGING AT LEAST ONE TOP-LOADING CRUSHER

[75] Inventors: Bernd Kirchhoff; Hermann Mecklenfeld, both of Ennigerloh, Fed. Rep. of Germany

[73] Assignee: O&K Orenstein & Koppel Aktiengesellschaft, Dortmund, Fed. Rep. of Germany

[21] Appl. No.: 867,647

[22] Filed: May 28, 1986

[30] Foreign Application Priority Data

Jun. 4, 1985 [DE] Fed. Rep. of Germany ....... 3520062

[51] Int. Cl.⁴ ............................................. B02C 21/02
[52] U.S. Cl. .................................... 241/80; 241/101.2; 241/101.7
[58] Field of Search ............ 198/307.1; 241/80, 101.2, 241/101.7, 186 R

[56] References Cited

U.S. PATENT DOCUMENTS

| 4,236,675 | 12/1980 | Bladykas | 241/101.7 X |
| 4,433,813 | 2/1984 | Whatton et al. | 241/101.7 X |
| 4,491,279 | 1/1985 | Long et al. | 241/101.7 |

FOREIGN PATENT DOCUMENTS 895194 5/1962 United Kingdom ................... 198/7

Primary Examiner—Timothy V. Eley
Attorney, Agent, or Firm—Martin A. Farber

[57] ABSTRACT

The invention concerns an apparatus for charging at least one top-loading crusher (1) with material which is fed batchwise by a plurality of transport vehicles (2) and is introduced into the crusher (1) by a bucket (5) which is loaded in each case by at least one transport vehicle (2) in a receiving position (A) adapted to the plane of movement of the transport vehicle (2) and can be raised into a transfer position (B) in which the bucket (5) is tipped in order to empty it into the crusher (1), the crushed material being withdrawn from the crusher (1) by means of a conveyance device (3). The crusher (1) is arranged on a transportable supporting framework (4) on which at least two buckets (5) acting as intermediate bunkers can be raised and lowered in order to produce a continuous charging of material for the crusher (1), the buckets feeding the charge material to a receiving hopper (7) which serves as further intermediate bunker and is arranged in front of the crusher (1), as seen in the direction of the flow of the material.

8 Claims, 8 Drawing Figures

APPARATUS FOR CHARGING AT LEAST ONE TOP-LOADING CRUSHER

FIELD AND BACKGROUND OF THE INVENTION

The present invention relates to an apparatus for loading at least one top-loaded crusher with charge material delivered by a plurality of transport vehicles, the charge material being fed to the crusher by a bucket which is loaded by in each case at least one transport vehicle which is in a receiving position adapted to the plane of movement of the transport vehicle and can be raised into a transfer position in which the bucket is tipped in order to discharge it into the crusher, the comminuted material being withdrawn from the crusher by means of a conveyance device.

In quarries and open-pit ore and coal mining, loose material brought by transport vehicles, particularly dump trucks or shovel loaders, is comminuted in crusher installations before it is transported away by a conveyance device, in particular a conveyor belt system. The size or capacity of the crusher is dependent in this connection on the loading capacity and the possible haulage cycles of the transport vehicles.

Loading devices are known in which the transport vehicles discharge the material into an intermediate bunker which is set up at the site and from which the charge material is fed to the crusher by an intermediate conveyor. For higher throughputs the intermediate bunkers must be made correspondingly large, thus resulting in a considerable expense for construction. In order to keep the upper discharge edge of the intermediate bunker as low as possible for loading by the transport vehicles, the intermediate conveyors must be made relatively long so that they can bridge over the difference in height to the charging opening of the crusher which is loaded from the top. This results in a very expensive installation which cannot be moved because of its large weight so that optimal association of the crusher with the specific place of excavation is not possible. As intermediate conveyors flight conveyors are customarily used, which can limit the capacity of the crusher system.

There is also known a stationary crusher which is loaded batchwise by dump carts. Each dump cart discharges the charge material into a bucket which is in a receiving position and can be lifted to a transfer position above the crusher. The charge material is in this case discharged directly into the crusher, which is therefore loaded batchwise, so that it is not working on material between two consecutive loadings. In addition to the lost time resulting from this, this known apparatus has the disadvantage that the crushed material is also obtained batchwise. With the known construction this is unimportant since the removal of the crushed material is also effected by dump carts, i.e. batchwise.

SUMMARY OF THE INVENTION

The object of the present invention is so to develop an apparatus of the aforementioned type that, despite the batchwise delivery of the charge material by a plurality of transport vehicles, preferably ground-level conveyance means, which are not restricted to rails, such as dump trucks and wheel loaders, continuous operation of the crusher results and thus continuous removal of the crushed material can be obtained. At only a small investment expense, high throughputs are thereby obtained and relocation of the apparatus is possible.

The solution of this problem which is provided by the invention is characterized by the fact that the crusher is arranged on a transportable supporting framework on which at least two buckets, acting as intermediate bunkers, can be raised and lowered to produce a continuous charging of material for the crusher, the buckets feeding the charge material into a receiving hopper which serves as further intermediate bunker and is arranged in front of the crusher, as seen in the direction of flow of the material.

By this proposal of the invention there is obtained a charging device for at least one crusher which does not require a stationary, expensive charging bunker or intermediate conveyor, so that, on the one hand, investment expenses are reduced and, on the other hand, the prerequisite is created for developing the charging device movable so as to adapt it to the varying place of loading. By the provision of at least two buckets which alternately receive the charge material and transfer it into the crusher a certain supply of charge material is built up which, in cooperation with the charging hopper which is arranged in front of the crusher and which also has the effect of an intermediate bunker, results in continuous loading of the crusher, the mobility of the supporting framework seeing to it that, as the excavation of the charge material proceeds, the delivery conditions for the transport vehicle can be always optimally the same.

Another advantage of the apparatus of the invention is that the lower receiving position of the buckets can be adapted in simple manner to the specific conditions and the specific transport vehicles used. If shovel loaders are used as transport vehicles instead of dump trucks, the receiving position of the buckets can be raised, for instance, by lowering them less on the supporting framework. Such an adaptation of the lower receiving position of the buckets can be effected, for instance, also in quarries which have different levels, without any structural change in the loading device being necessary.

By the use of at least two buckets, the loading device of the invention is suitable also for large throughputs since charging by a plurality of transport vehicles is possible and, in connection therewith, the arrival and departure of which can be readily controlled. In this way, despite the batchwise delivery, continuous operation of the crusher is obtained, the dumping of the buckets being suitably controllable so that sudden discharges of the buckets are avoided. By the oppositely directed movement of the buckets between the receiving and transfer places the possibility is finally created of recovering energy upon the lowering of the empty bucket, so that in practice up to 30% of the lift energy can be saved.

In one preferred embodiment of the invention, each bucket can be loaded from several sides in its receiving position. For this purpose, each bucket is developed on its top with a plurality of opening edges which extend at an angle to each other so that two or three transport vehicles can simultaneously load the material to be crushed into the bucket.

In a further development of the apparatus of the invention, the receiving hopper is arranged directly above the crusher in the supporting framework. As an alternative to this, a continuous conveyor can be arranged between the receiving hopper and the crusher.

In a further development in accordance with the invention, the buckets are arranged on opposite sides of the supporting framework. In accordance with the invention, it is also possible to arrange the buckets on three sides of the supporting framework. Finally, it is possible to provide a screen between the receiving hopper and the crusher or continuous conveyor.

BRIEF DESCRIPTION OF THE DRAWING

Various illustrative embodiments of the loading device of the invention are shown in the drawing, in which.

DETAILED DESCRIPTION OF THE PREFFERED EMBODIMENT

Figure 1:
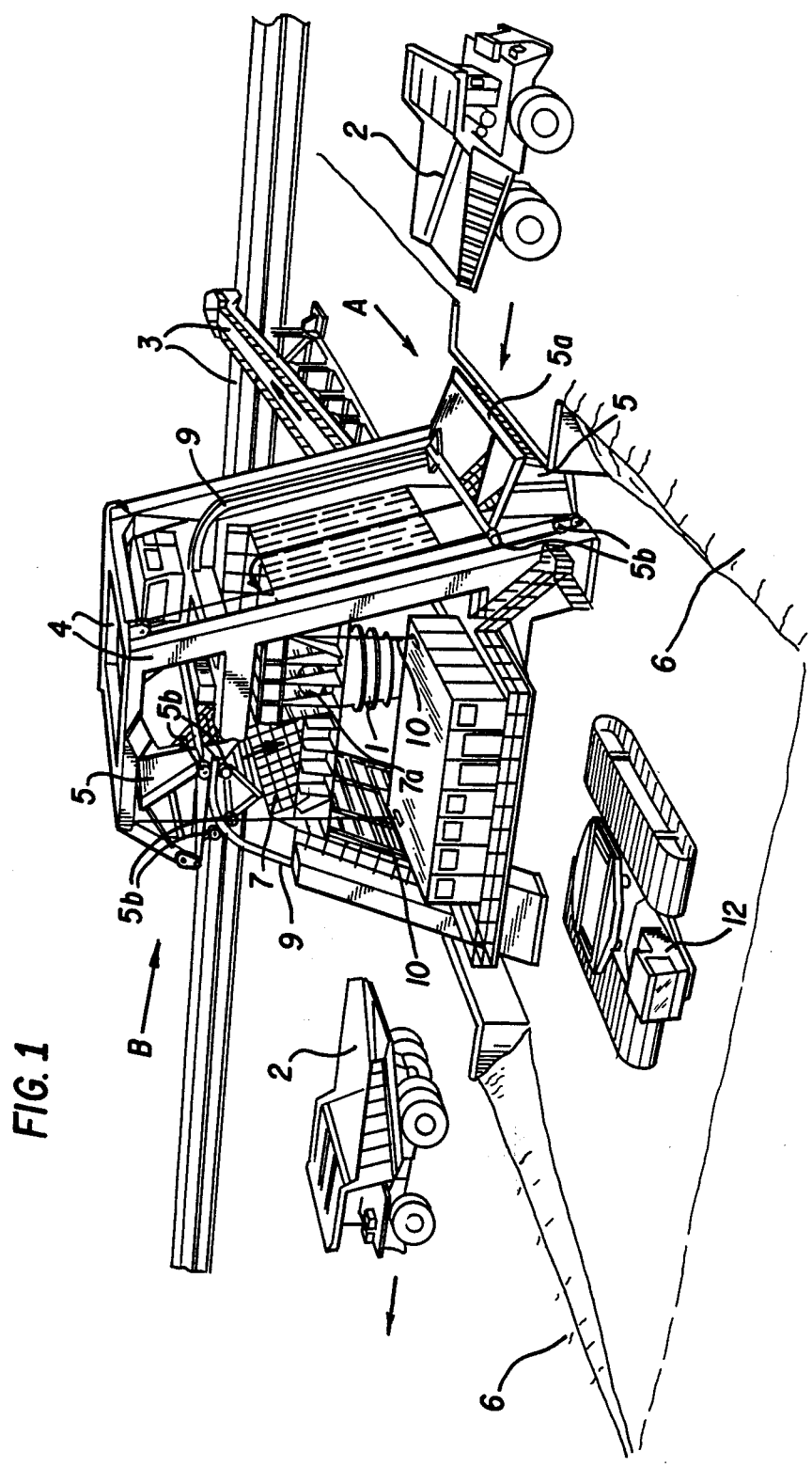
FIG. 1 is a perspective showing of a first embodiment.
Figure 2:
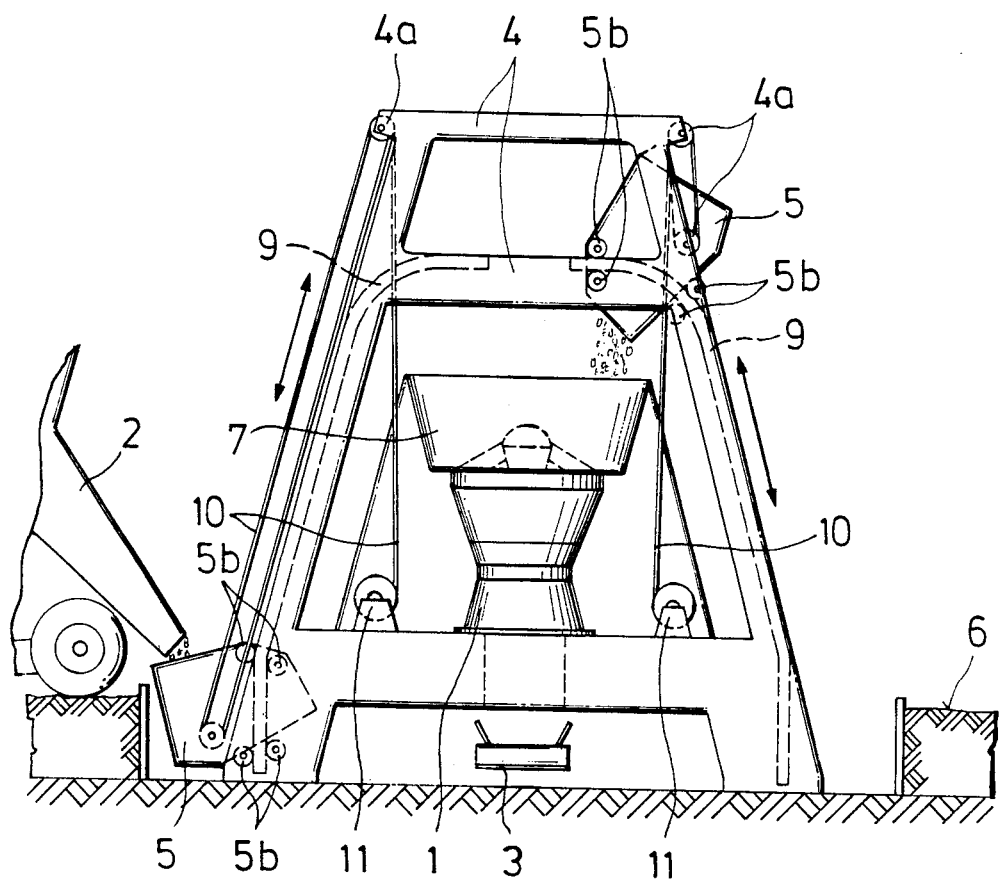
FIG. 2 is a diagrammatic showing of the embodiment of FIG. 1, seen in side view.

The perspective view of the first embodiment given in FIGS. 1 and 2 shows the use of the loading device in open-pit mining. The material to be loaded is fed to a crusher 1 by a plurality of transport vehicles 2, which in this embodiment are shown in the form of dump trucks but could, for instance, also be shovel loaders. The material which has been crushed in the crusher 1 is removed by means of a conveyor 3 which comprises an ascending transfer conveyor belt which feeds the material coming from the crusher 1 to a conveyor belt system which can be noted in the background in FIG. 1.

In the first embodiment, the crusher 1 is arranged within a supporting framework 4 which is provided with a bucket 5 on each of two opposite sides. These buckets 5 can be lifted from a lower receiving position A into a transfer position B. In the transfer position B, the buckets 5 are tipped, as shown by the left-hand bucket 5 in FIG. 1 and the right-hand bucket 5 in FIG. 2.

As can be noted in particular from FIG. 1, in this arrangement the supporting framework 4 is lowered to slightly below the plane of movement 6 of the transport vehicles 2, in the manner that the supporting framework is arranged in a slight trough. In this way there is the possibility of loading the buckets 5 which are in the receiving position A by a transport vehicle 2 which is developed as dump truck without it being necessary for the transport vehicles 2 to travel over ascending ramps. The opening edges 5a of the buckets 5 are located approximately at the height of the plane of movement 6 of the transport vehicles 2.

The arranging of the supporting framework 4 in a slight trough can be dispensed with by the use as transport vehicles 2, for instance, of shovel loaders which transfer the material to be crushed at a distance above their plane of movement 6. Adjustment of the discharge edge, i.e. of the opening edge 5a of the buckets 5, in the receiving position A can be varied in simple fashion by changing the specific lowermost position of the buckets 5 on the supporting framework 4.

In the embodiment shown in FIGS. 1 and 2, a receiving hopper 7 is arranged in the supporting framework 4 below the transfer position B of the buckets 5. A screen 7a can be provided between this receiving hopper 7 and the crusher 1.

Figure 3:
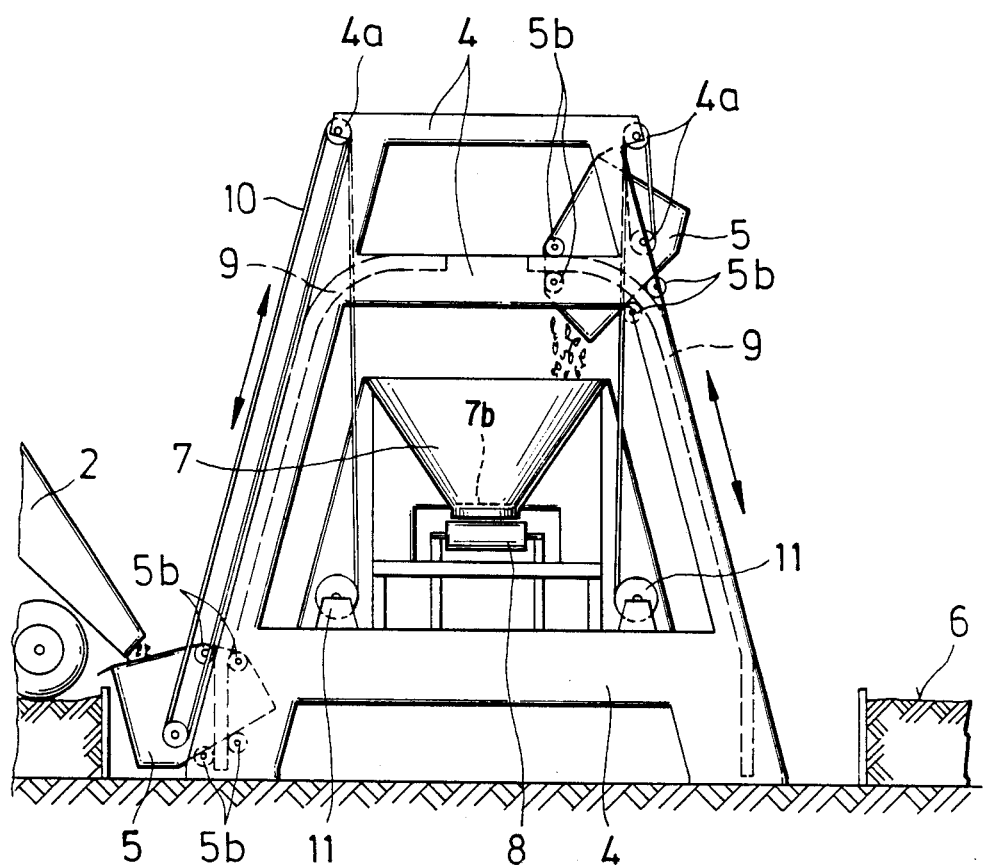
FIG. 3 is a side view, corresponding to FIG. 2, of a modified embodiment.

In the second embodiment, shown in FIG. 3, the crusher 1 is arranged outside the supporting framework 4. The latter is provided instead with a continuous conveyor 8, for instance a flight conveyor or a conveyor trough which feeds the material to be crushed from the receiving hopper 7 to the crusher 1, not shown in the drawing. A screen 7b can also be placed between the hopper 7 and the conveyor 8.

In the case of both embodiments the buckets 5 are guided by means of wheels 5b on travel rails 9 which are curved at their upper end so that the buckets 5 are brought positively at the transfer position B into tipped position in which they discharge the material into the receiving hopper 7. The raising and lowering of the buckets 5 is effected by means of ropes 10 which pass over pulleys 4a arranged in the supporting framework 4 and can be wound onto rope drums 11 by the driving of which the raising and lowering of the buckets 5 is effected. When the buckets 5 are being let down, the energy can be stored, or it can be used directly to assist in the lifting of another bucket 5.

Figure 4:
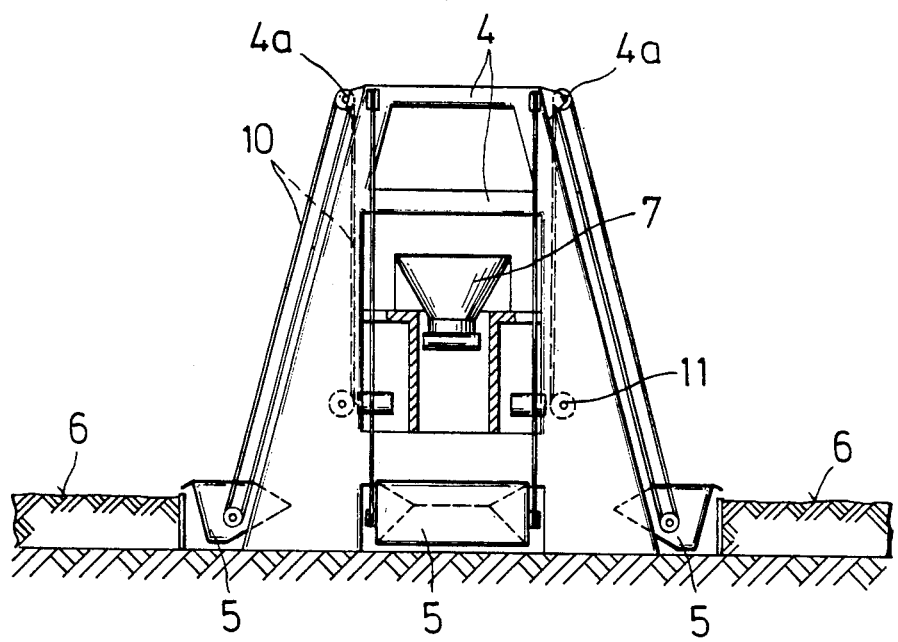
FIG. 4 shows a third possible embodiment, also in a diagrammatic side view.
Figure 5:
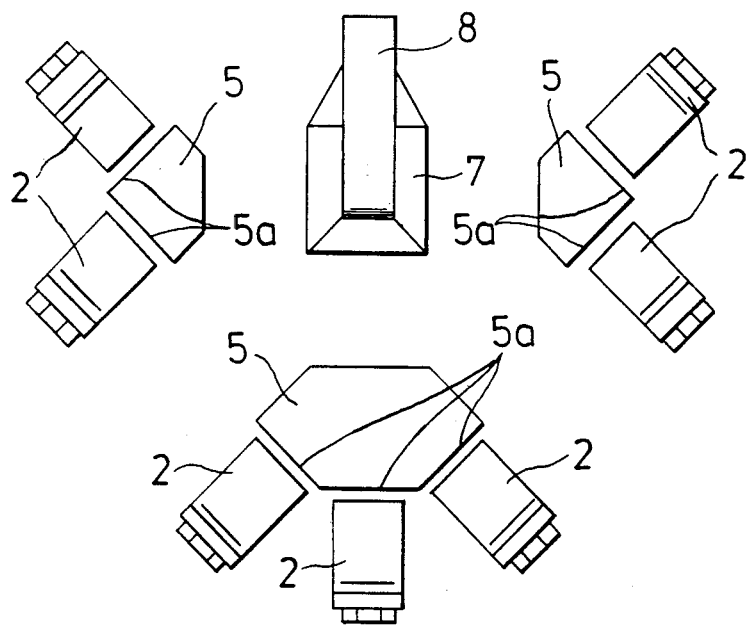
FIG. 5 is a plan view of the embodiment of FIG. 4.

As shown in FIGS. 4 and 5, three buckets 5 can also be arranged in lifting manner on the supporting framework 4. The top view of FIG. 5 shows that each bucket is developed with two or three opening edges 5a extending at an angle to each other so that several transport vehicles 5 can simultaneously discharge their material to be crushed into the corresponding bucket 5.

Figure 6:
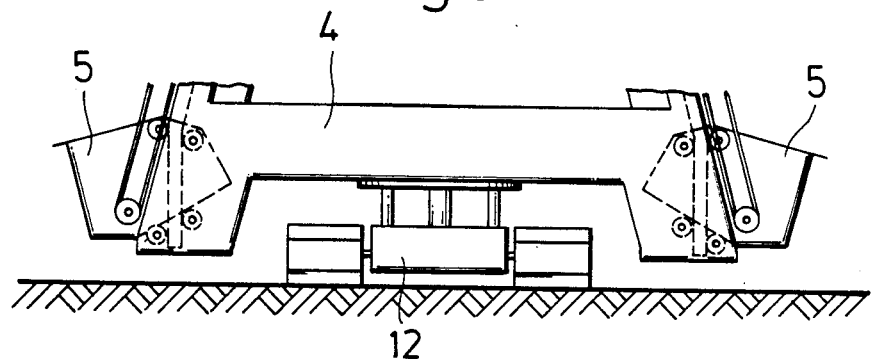
FIG. 6 is a partial view of a supporting framework provided with a track-laying undercarriage.
Figure 7:
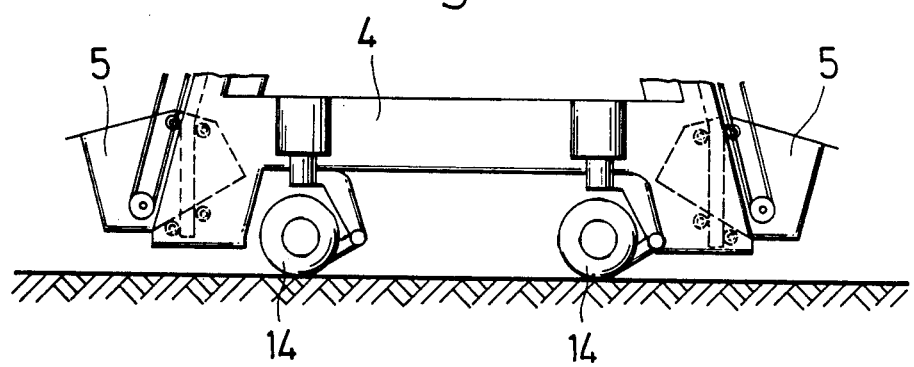
FIG. 7 is a partial view, corresponding to FIG. 6, using a wheel undercarriage.
Figure 8:
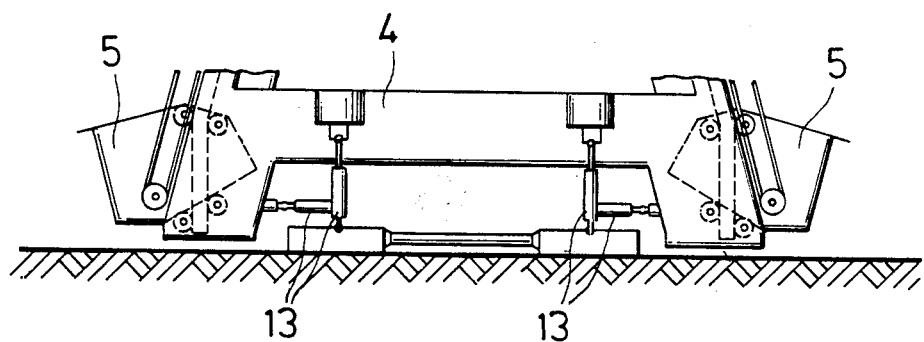
FIG. 8 is another partial view of a supporting framework provided with walking legs.

In order to adapt the location of the loading device described above to a changing location of feed, the supporting framework 4 can be transported together with the crusher 1 or the continuous conveyor 8. This can be done by means of a track-laying undercarrriage 12, as shown in FIGS. 1 and 6. Instead of a track-laying undercarriage 12, walking legs 13 can also be used, as shown in FIG. 8, or an undercarriage with wheels 14 as shown in FIG. 7.

We claim:

1. A crusher system comprising:
   a top-loading crusher for converting bulk charge material to comminuted material;
   a transportable supporting framework, said crusher being carried by said framework at a lower portion thereof;
   a plurality of buckets arranged along sides of said framework;
   means for elevating said buckets from a loading position near a bottom of said framework to a discharge position at a top of said framework, said elevating means orienting said buckets at said loading position to direct openings of said buckets for receiving charge material from external transport vehicles, said elevating means reorienting said buckets at said discharge position to direct said bucket openings for discharging said charge material; and
   a hopper disposed between said crusher and said discharge position for directing charge material from said buckets to said crusher, said hopper receiving charge material intermittently from said buckets and continuously feeding said charge material to said crusher.

2. The system according to claim 1 wherein
each bucket can be loaded from several sides at the loading position.

3. The system according to claim 1 wherein
said hopper is located directly above said crusher.

4. The system according to claim 1 further comprising
a continuous conveyor disposed between an outlet of said hopper and an inlet of said crusher for delivering charge material from said hopper to said crusher with a continuous feed.

5. The system according to claim 4 further comprising
a screen disposed between said hopper and said conveyor.

6. The system according to claim 1 wherein
said buckets are arranged on opposite sides of said framework.

7. The system according to claim 1 wherein
said buckets are arranged on three sides of said framework.

8. The system according to claim 1 further comprising
a screen disposed between said hopper and said crusher.

* * * * *